United States Patent [19]

Brumfield

[11] 4,368,124
[45] Jan. 11, 1983

[54] METHOD OF WINDING A MASS TRANSFER DEVICE AND PRODUCT

[76] Inventor: Robert C. Brumfield, P.O. Dr. CC, 42 Lakeshore Ter., Incline Village, Nev. 89450

[21] Appl. No.: 221,999

[22] Filed: Jan. 2, 1981

Related U.S. Application Data

[63] Continuation-in-part of Ser. No. 28,238, Apr. 9, 1979, abandoned, and a continuation-in-part of Ser. No. 117,207, Jan. 31, 1980, abandoned.

[51] Int. Cl.³ .................... B01D 13/04; B65H 81/00
[52] U.S. Cl. ............................. 210/321.3; 156/172; 156/173
[58] Field of Search ........... 156/172, 173, 175, 296, 156/258, 74, 79, 149; 264/261, 263; 210/321.1, 321.2, 321.3, 321.5

[56] References Cited

U.S. PATENT DOCUMENTS

| | | | |
|---|---|---|---|
| 2,108,013 | 2/1938 | Fehr | 156/169 |
| 3,422,008 | 1/1969 | McLain | 210/321 R |
| 3,442,002 | 5/1969 | Geary et al. | 210/321 R |
| 3,503,515 | 3/1970 | Tomsic | 210/321 |
| 3,557,962 | 1/1971 | Kohl | 210/321 R |
| 3,963,622 | 6/1976 | Baudet et al. | 210/321 R |
| 4,038,190 | 7/1977 | Baudet et al. | 210/321 R |
| 4,140,637 | 2/1979 | Walter | 210/321 R |
| 4,259,991 | 4/1981 | Kutayak | 156/149 |

FOREIGN PATENT DOCUMENTS

2721444 11/1978 Fed. Rep. of Germany.
2012187 7/1979 United Kingdom.

*Primary Examiner*—Michael W. Ball
*Attorney, Agent, or Firm*—Weissenberger and Peterson

[57] ABSTRACT

A mass transfer device of the type used, e.g., for blood dialysis is made by winding on a mandrel a series of fiber strands, each of which consists of a solid fiber and one or more hollow fibers, the solid fiber being at least as large, and preferably substantially larger, in diameter than the hollow fiber. As the strands are wound on the mandrel they are temporarily anchored at spaced locations along the mandrel by beads of a liquid pre-potting compound which eventually harden into said anchor plates. When the winding is complete, the mandrel is cut at each anchor plate to form individual temporary cartridges which can withstand the handling required in washing and drying. After each individual cartridge is final-potted, the anchor plates are discarded, and the final potting is cut in a conventional manner to form manifold surfaces at each end of the cartridge. A deburring treatment is then applied to the manifold surface at each end of the cartridge to smooth out any microscopic irregularities of the manifold surface which can cause thrombogenesis.

16 Claims, 10 Drawing Figures

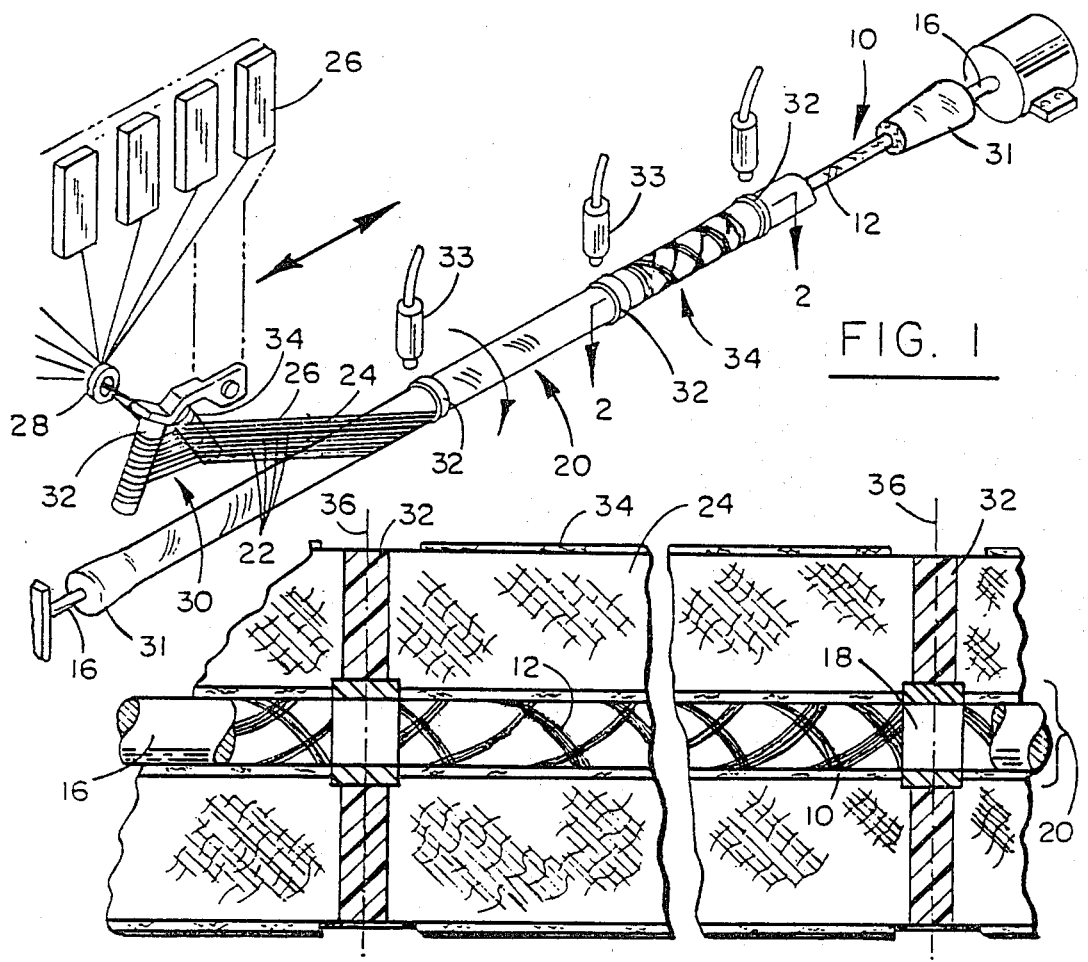
FIG. 1
FIG. 2
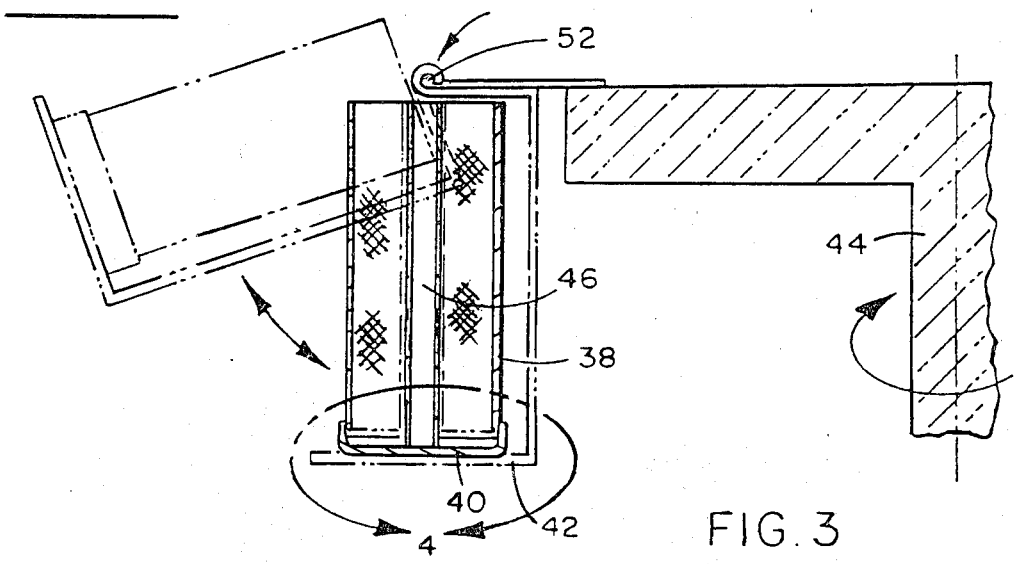
FIG. 3

METHOD OF WINDING A MASS TRANSFER DEVICE AND PRODUCT

RELATED CASES

This application is a continuation-in-part of my copending applications Ser. No. 028,238 filed Apr. 9, 1979, entitled MASS TRANSFER DEVICE AND METHOD OF MAKING THE SAME now abandoned; and Ser. No. 117,207 filed Jan. 31, 1980, entitled METHOD AND STRUCTURE FOR PROTECTING FRAGILE STRANDS WOUND ON A MANDREL now abandoned.

BACKGROUND OF THE INVENTION

Mass transfer devices such as blood dialysis cartridges or the like are conventionally made from bundles or parallel semipermeable hollow fibers through which blood is caused to flow while the fibers are immersed in dialysate. A common problem of these devices is the tendency of the fibers to bunch or mat together so that the free flow of dialysate over the entire surface of the fibers is substantially impaired. The resulting loss of mass transfer efficiency slows down the dialysis process and is economically wasteful.

It has been proposed (U.S. Pat. No. 3,422,008 to McLain and No. 3,794,468 to Leonard) to wind hollow fibers on a mandrel to form a dialysis cartridge. This method alleviates the bunching problem to some degree. However, the hollow semipermeable fibers used in blood dialysis equipment are quite delicate and cannot be wound with a great deal of tension for fear of damage. They also tend to be limp and floppy when in use. Consequently, the dialysis fibers have considerable freedom of movement and are still somewhat subject to bunching under the fluid flow forces of the dialysate. In addition, when the hollow fibers in the prior art devices bunch in a radial direction with respect to the mandrel, there is a danger that they may pinch each other at crossovers.

As suggested by the aforesaid McLain U.S. Pat. No. 3,422,008, it is desirable to wind a plurality of cartridges from continuous fibers on a single mandrel and to provide "tubesheets" at intervals along the mandrel where cuts can subsequently be made to form manifold surfaces at which the interior of the hollow fibers is accessible.

Experience has shown, however, that the "tubesheets" applied during the winding make a poor bond with the fibers, mostly because the fibers as wound are oily and wet. It is therefore not practical to use the original "tubesheets" in the final dialysis cartridge.

In addition, the prior art blood dialysis devices tend to thrombogenic, i.e., they tend to cause blood clotting which must be counteracted by medication, and which in a significant number of cases makes the patient intolerant of this type of equipment.

SUMMARY OF THE INVENTION

The invention overcomes the above problems of the prior art by winding the fibers in strands consisting of one or more hollow active fibers and a set of thicker, solid spacer fibers laid down parallel to and on each side of the hollow fibers.

If the strand is wound with sufficient tension to cause successive layers to lie firmly against each other, this arrangement results in the formation of a cage-like structure with continuous protective channels defined by the solid fibers. The smaller hollow fibers lie loosely in those channels and are supported by the solid fibers of the layer below them to prevent them from pinching the hollow fibers of the layer below.

It will be noted that the cage-like structure disclosed herein can also be used to protect and channel non-hollow easily deformable fibers, such as those used in fiber filter equipment due to the formation of continuous uniquely protected passageways in which the easily deformable fibers can lie.

Inasmuch as it is desirable, when winding dialysis cartridges, to produce a plurality of cartridges in a single winding, beads of resinous adhesive are deposited on the mandrel during the winding operation, each bead being spaced from the next by one cartridge length. These beads harden into solid temporary anchor plates similar to the "tubesheets" of McLain Pat. No. 3,422,008 which hold the fibers in place, and through which the wound mandrel can eventually be cut to form individual temporary cartridges which are strong enough to withstand the handling involved in washing and drying the fibers (to remove inherent moisture and organic oil preservative introduced into the fibers during manufacture).

Following the assembly of the temporary cartridges into appropriate housings by a conventional final-potting process (in which the potting material forms a solid, fluid-tight bond with the dry fibers), the temporary anchor plates are cut off and discarded, and a cut is made through the final potting to form a manifold surface at which the interior of the hollow fibers is accessible without significant leakage.

In accordance with my U.S. Pat. No. 4,211,602, thrombogenesis can be largely prevented by rounding the edges of the fiber walls where they protrude through the manifold surface, to eliminate microscopic burrs or sharp irregularities and debris on the manifold surface on which clotting can start. The present invention achieves this in a preferred embodiment by depositing onto the manifold surface a meniscus-forming solution of polyurethane which is then cured to form a thin, smooth, lacquer-like layer which smoothes out any microscopic surface irregularities but does not clog the open ends of the hollow fibers.

BRIEF DESCRIPTION OF THE DRAWINGS

FIG. 1 is a schematic perspective view, partly cut away, showing the winding operations involved in the manufacture of blood dialysis cartridges in accordance with the invention;

FIG. 2 is an axial section along line 2—2 of FIG. 1;

FIG. 3 is an elevational view, partly in section, showing the final potting step of the inventive method;

DESCRIPTION OF THE PREFERRED EMBODIMENT

Figure 4:
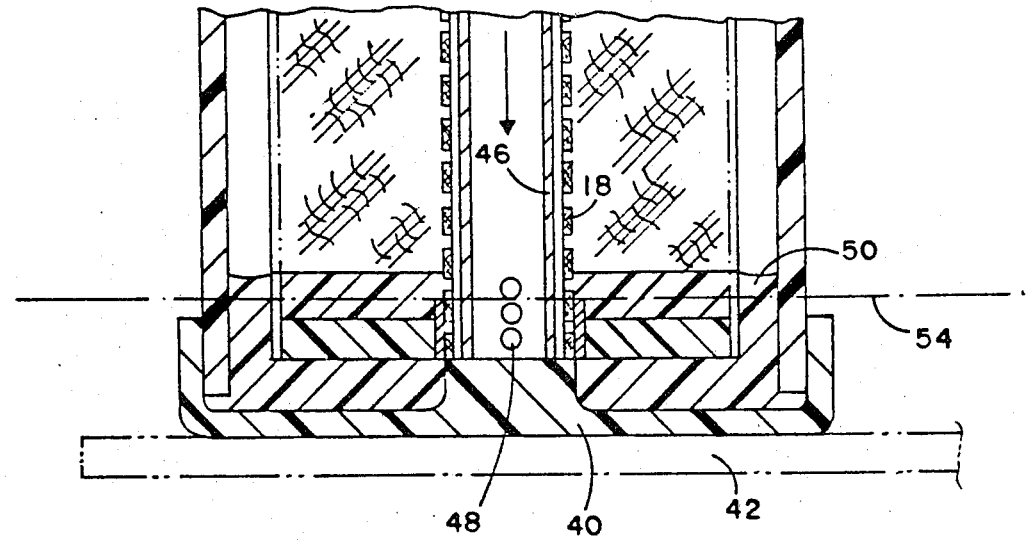
FIG. 4 is an enlarged vertical section of a portion of FIG. 3 along line 4—4.

In accordance with a preferred embodiment of the invention, an apertured basket-weave core 10 is first formed by any well-known commercial technique, as for example by molding or by passing a ribbon 12 of Dacron fibers or other suitable material through an epoxy bath (not shown) and winding it on a winding stick 16 in the criss-cross pattern best illustrated in FIG. 2 to a thickness of about one millimeter. For the purposes of this invention, the rigid basket-weave core 10 is used in sections slightly shorter than the eventual length of a finished blood dialysis cartridge.

The cut sections of core 10 are now slipped back onto winding stick 16 (FIG. 2), but this time the core sections 10 are separated from one another by plastic spacers 18 of the same inside diameter but preferably somewhat greater outside diameter. The winding stick 16, core sections 10, and spacers 18 together form a mandrel 20 onto which the hollow semipermeable dialysis fibers 22 can be wound.

Figure 7:
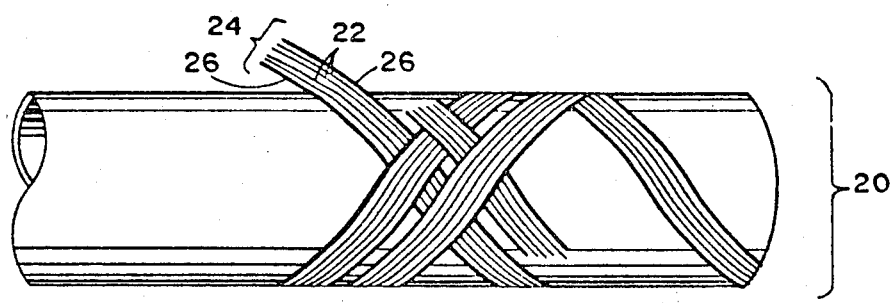
FIG. 7 is an enlarged view of the fiber strand pattern laid down by the winding apparatus of FIG. 1.

As best shown in FIGS. 1 and 7, one or more fiber strands 24 each consisting of a thick, solid spacer fiber 26 and one or more hollow dialysis fibers 22 are wound side-by-side onto the mandrel 20 of FIG. 2. Any conventional technique for laying down the fiber strands 24 in the pattern shown in detail in FIG. 7 may be used. As an example, the individual fibers may be brought from creels 37 (FIG. 1) through a feed eye 28 which is mounted for reciprocating lengthwise movement along the mandrel 20. Between the feed eye 28 and the mandrel 20, the fibers are drawn through a comb 30 extending between a pair of inclined, generally cylindrical guides 32, 34. The guides 32, 34 in conjunction with the comb 30, assure that the individual fibers of fiber strands 24 are laid down on the mandrel 20 parallel to each other and properly spaced from one another.

Figure 8:
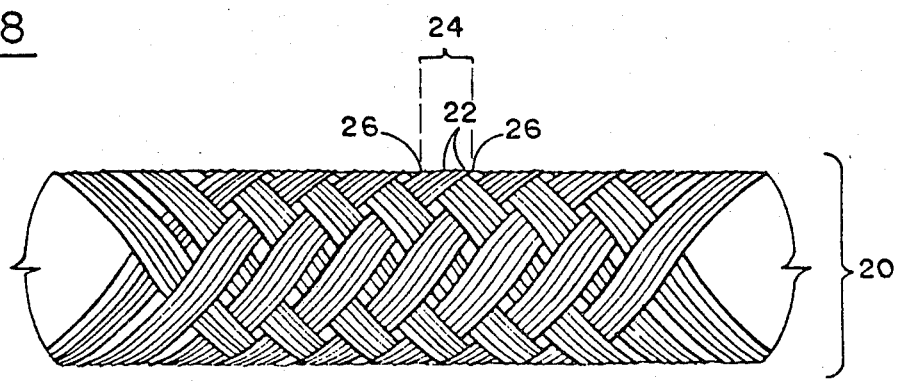
FIG. 8 is a view similar to that of FIG. 7, further showing the braided pattern resulting after a considerable number of passes.

The fiber pattern produced by the foregoing method is illustrated in an enlarged scale in FIG. 7. Fiber strands 24 are wound along the mandrel as a unit. Each group 24 preferably consists of a pair of relatively still solid fibers 26 (e.g., nylon monofilament, about 300 μm O.D.) enclosing between them one or more hollow fibers 22 (e.g., about 200 μm O.D. cellulose). The solid fibers 26 are at least about 80% as thick as, and preferably thicker than, the hollow fibers 22. The effect of this procedure can best be visualized in FIG. 8, from which it will be apparent that the solid fibers 26 of successive layers form a support structure or cage as they criss-cross each other. The cage formed by the thick fibers 26 provides continuous passageways 29 in which the thinner hollow fibers 22 are protected from compression by other fiber layers.

In practice, it has been found that windings produced as described herein tend to puff up and become somewhat spongy, i.e. the solid fibers of adjacent layers are not necessarily in contact with one another throughout the winding. However, it has also been found that even in that condition, the structure retains enough of a cage-like nature to support the hollow fibers in generally the same spaced relationship in which they were wound.

Figure 9:
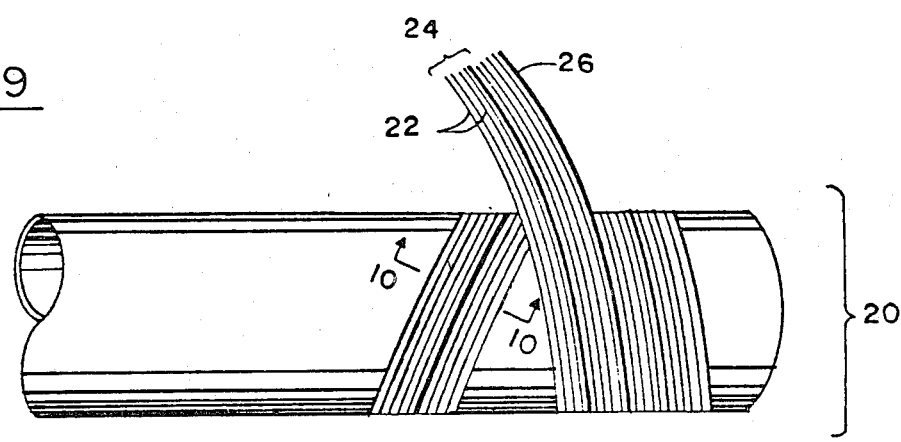
FIG. 9 is an enlarged view of an alternate fiber strand pattern illustrating the use of only one solid spacer fiber laid parallel to the hollow fibers, thereby completing one cage and defining one side of the adjacent cage.
Figure 10:
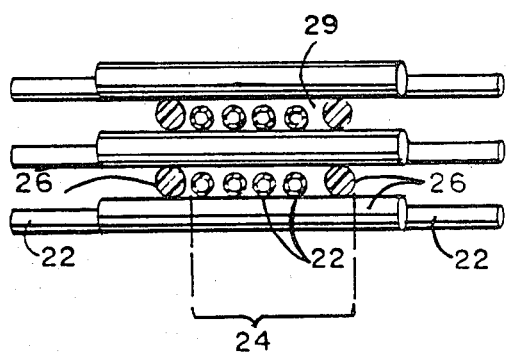
FIG. 10 is a sectional view of the winding along line 10—10 of FIG. 9 illustrating the passageways produced by the use of the alternate winding process.

FIG. 9 shows an alternative fiber strand pattern in which the total surface area of the mandrel is wound in one pass. Each successive layer is wound in one pass. The strands 24 consist of one or more hollow fibers 22 and only one solid spacer fiber 26 which completes one cage when laid and defines one side of the adjacent cage. This is best illustrated in FIG. 10, taken along line 10—10 of FIG. 9. Two end solid spacer fibers 26 define the cage-like structure providing the continuous passage-ways 29 for the thinner hollow fibers 22.

These alternative fiber patterns as well as other patterns using solid spacer fibers to provide a cage-like structure eliminate or at least substantially reduce the bunching and pinching of fibers thereby significantly increasing their mass transfer efficiency and the dialysis process.

The winding method shown in FIG. 1 forms waste portions 31 of significant length at each end of the mandrel 20 where the winding direction of the strands 24 is reversed at the end of each pass of the feed eye 28. It is therefore economically necessary to wind a substantial number of cartridges on a single mandrel to keep the percentage of waste within tolerable limits.

To this end, beads 32 of a hardenable liquid resin such as epoxy are applied to the fiber strands 24 from guns 33 at spaced locations along the mandrel 20 as they are wound. The locations of beads 32 coincide with the locations of spacers 18 along mandrel 20. The epoxy beads 32 adhere to the spacers 18 and to the fibers of strands 24, and as the beads 32 harden, they form solid anchor plates which firmly secure the fibers 22 and 26 in fixed positions at spaced intervals along the mandrel 20. However, the anchor plates do not, and are not intended to, form fluid-tight bonds with the fibers of strands 24. Consequently, as pointed out hereinafter, they cannot serve as manifolds in the finished cartridge.

When the desired number of winding passes has been made, a flexible basket-weave retaining net (FIG. 1) may be wound over the fiber strands 24 between the beads 32, using a Dacron or other chemically inert ribbon coated with just enough epoxy to cause successive layers of ribbon to stick to each other without becoming rigid.

With the anchor plates 32 having hardened, the mandrel 20 with the fiber strands 24 wound thereon is now removed from the winding stick 16, and cuts are made along lines 36 (FIG. 2) to separate the individual cartridges. The anchor plates 32, after cutting, co-act with the spacers 18 and the core sections 10 to form a sufficiently rigid temporary cartridge structure to allow the partly completed cartridges to be handled for washing, drying and storage.

Because of the fact that the anchor plates 32 do not bond sufficiently well to the unwashed and undried fibers of strands 24, during the winding process, they cannot be used to provide a fluid-tight seal between the interior of the finished cartridge and the blood manifold (not shown) with which the interior of the hollow fibers 22 communicates in the finished device. Consequently, a final potting step has to be performed to assemble the temporary cartridge assembly with the outer housing 38 of the finished cartridge after the fibers have been washed and dried.

This may be done in any convenient way, but in the preferred embodiment of the invention, as illustrated in FIGS. 3 and 4, the temporary cartridge assembly is placed, one at a time, into a mold 40 attached to the cradle 42 of a centrifuge 44. A riser tube 46 with openings 48 at its lower end is placed into the core 18, and an appropriate amount of a conventional polyurethane potting compound 50 (FIG. 4) is poured into the tube 46.

The centrifugal 44 is then turned on and the resulting centrifugal force swings cradle 42 about hinge 52 to a horizontal position. At the same time, the centrifugal force evenly distributes the potting compound 50 over the lower (now outer) end of the cartridge to permanently anchor the fibers and form a fluid-tight seal around the fibers and with the outer housing 38.

After the final potting operation has been repeated for the other end of the cartridge, and the ends of the cartridge have been cut off along line 54 (FIG. 4) to remove and discard the now useless anchor plates 32, the cartridge is ready for assembly, in a conventional manner, into a dialysis unit (not shown).

Figure 6:
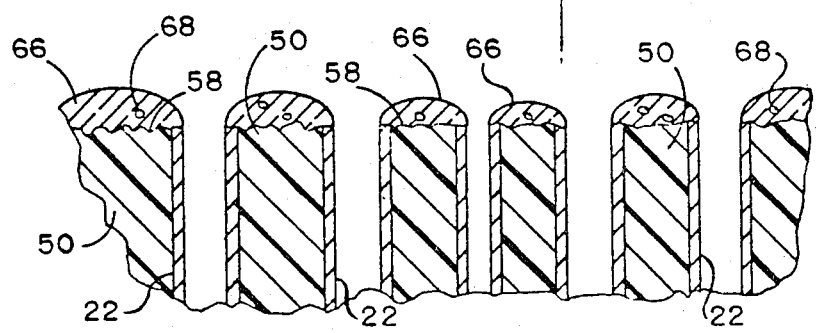
FIG. 6 is an enlarged slice-type vertical section of a portion of the manifold surface following treatment, as indicated by line 6—6 of FIG. 5.

As previously stated herein, it has been observed that cut fiber dialysis cartridges tend to produce thrombogenesis in the patient. In accordance with this invention, this problem is overcome by rounding the microscopic sharp edges or burrs left by the cutting operation at the end of the hollow dialysis fibers 22 where they protrude from the manifold surface 58 (FIG. 6).

Figure 5:
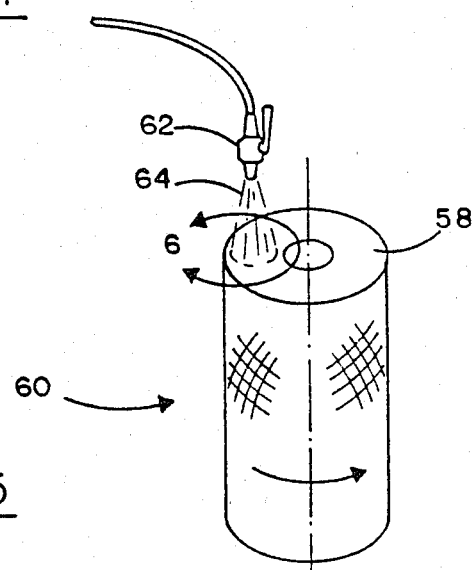
FIG. 5 is a schematic elevational view illustrating the manifold surface treatment of the invention.

The manifold surface 58 (FIGS. 5 and 6) of potting compound 50 is made non-thrombogenic by the process illustrated in FIG. 5. As shown in that figure, the cartridge 60 is slowly rotated for two or three revolutions under a fogging nozzle 62 which deposits an extremely fine mist (e.g., 10–20 micron droplet size) of polyurethane solution 64 (in the preferred embodiment, a solution consisting of 8% by weight Estane 5715 manufactured by B. F. Goodrich, 42% by weight of cellulose acetete, and 50% by weight of methyl ethyl ketone is used to advantage) onto the surface 58. The surface tension of the polyurethane solution causes it to form a meniscus 66 (FIG. 6) which covers any sharp edges of the dialysis fibers 22 without penetrating excessively into the interior of the fibers. The meniscus 66 is preferably cured into a hard, smooth surface similar to a lacquer by the application of warm, dry air and exposure for a few minutes to an infrared heat lamp.

In addition to rounding the entrances to the hollow interior of fibers 22, the cured polyurethane solution smooths the surface 58 and encapsulates any snags or debris from the cutting process that may still be present after the conventional cleaning of the surface 58 following the cutting step.

The range of polyurethane content of the solution which can be used for the purposes of this invention is determined by the fact that lower percentages of Estane, though feasible, are increasingly wasteful of solvent and spraying time, and that an Estane content of 10% or more by weight tends to make the solution viscuous to form a satisfactory meniscus, whereupon the hollow fiber ends start to plug.

The choice of solvent is, of course, not limited to the above-mentioned solvents, as the solvents act only as a volatile carrier. Consequently, any medically acceptable volatile solvent compatible with the polyurethane could be used. Other types of varnish which adhere to the fibers and d header material can be used provided the surface produced is relatively non-thrombogenic.

I claim:

1. In a dialysis cartridge made by winding hollow groups of one or more parallel tubular fiber membranes onto a mandrel in a criss-cross pattern, the improvement comprising at least one relatively stiff, generally solid fiber positioned to lie in said winding alongside with, and generally parallel to, each said group of hollow fibers without being twisted therewith, said generally solid fiber is at least 80 percent as thick as said hollow fiber such that said hollow fibers lie without substantial pinching.

2. The improvement of claim 1, comprising one of said solid fibers positioned to lie along each of the two sides of each said group of hollow fibers.

3. The improvement of claim 2, in which the thickness of said solid fiber is such that, when successive layers of said criss-cross pattern are placed into contact with one another, said hollow fibers are protected by said solid filaments from being pinched sufficiently to obstruct them.

4. In a dialysis cartridge made by winding hollow groups of one or more parallel hollow fiber membranes onto a mandrel in a criss-cross pattern, the improvement comprising at least one relatively stiff, generally solid fiber positioned in said winding alongside, and generally parallel to, each said group of hollow fibers without being twisted therewith; said generally solid fiber being at least 80 percent as thick as said hollow fiber; successive layers of said relatively stiff fiber positioned in the criss-cross manner forming a protective cage structure defining channels in which said group of hollow fibers can lie without substantial pinching.

5. The improvement of claim 1, 2 or 4, wherein said solid fibers are thicker than said hollow fibers.

6. The method of supporting and spacing easily deformable semipermeable filaments wound on a mandrel in a criss-cross pattern to form a mass transfer device, comprising the step of concurrently winding onto said mandrel, parallel to each other in a plane generally tangential to said mandrel, and without twisting them together, at least one of said easily deformable filaments and at least one relatively stiff filament; said relatively stiff filament is at least 80 percent as thick as said semipermeable filament such that said semipermeable filaments lie without substantial pinching.

7. The method of claim 6, wherein said easily deformable filaments are hollow and said relatively stiff filaments are solid.

8. The method of claim 6, wherein the thickness of said stiff filament is such that, when successive layers of said criss-cross pattern are placed into contact with one another, said hollow fibers are protected by said stiff filaments from being pinched sufficiently to significantly obstruct them.

9. The method of supporting and spacing easily deformable semipermeable filaments wound on a mandrel in a criss-cross pattern to form a mass transfer device, comprising the step of concurrently winding onto said mandrel, parallel to each other in a plane generally tangential to said mandrel, and without twisting them together, at least one of said easily deformable semipermeable filaments and at least one relatively still filament; said relatively stiff filament is at least 80 percent as thick as said easily deformable semipermeable filament successive layers of said relatively stiff filament positioned in said criss-cross manner forming a protective cage structure defining channels in which said easily deformable semipermeable filaments can lie without substantial pinching.

10. The method of claim 6 or 9, wherein the thickness of said relatively stiff filament is larger than the thickness of said easily deformable filament.

11. The method of claim 6 or 9, wherein a group of parallel easily deformable filaments is wound concurrently with a relatively stiff filament along each side of said group.

12. The method of making a mass transfer device by winding onto a mandrel at an acute angle to the axis thereof, successive fiber layers composed on non-twisted strands each including at least one relatively stiff, solid fiber and at least one relatively flexible, hollow semipermeable fiber, the fibers of each strand being parallel to each other in a plane generally tangential to the surface of said mandrel, and the strands of successive ones of said layers being at angles to one another, the hollow fibers being no thicker than said solid fibers, and said solid and hollow fibers being such that successive layers of said solid fibers positioned in a criss-cross manner form a protective cage structure defining channels in which said hollow fibers can lie without substantial pinching.

13. The method of claim 12, wherein said hollow semipermeable fibers are substantially thinner than said solid fibers.

14. The method of claim 2, characterized in that a plurality of said fibers are simultaneously laid down in parallel relation to each other.

15. The method of making a blood dialysis cartridge or the like, comprising the steps of:
(a) Winding onto an apertured mandrel at an acute angle to the axis thereof, successive fiber layers composed of non-twisted strands each including at least one relatively stiff solid fiber and at least one relatively flexible, hollow semipermeable fiber, the fibers of each strand being parallel to each other in a plane generally tangential to the surface of said mandrel, and the strands of successive ones of said layers being at angles to one another, the hollow fibers being thinner than said solid fibers, and the relative thicknesses of said solid and hollow fibers being such that successive layers of said solid fibers positioned in a criss-cross manner form a protective cage structure defining channels in which said hollow fibers can lie without substantial pinching:
(b) Applying to said fibers, during the winding thereof, a hardenable adhesive material adapted to hold said fibers in a fixed position at spaced locations along said mandrel;
(c) Allowing said adhesive material to harden;
(d) Cutting through said hardened adhesive material at said spaced locations to form individual temporary cartridges;
(e) Final-potting the ends of said temporary cartridges to fit into a housing in sealing relationship;
(f) Cutting through said final-potted ends to remove said adhesive material and expose the ends of said fibers in a manifold surface; and
(g) Treating the exposed ends of said fibers and said manifold surface with a meniscus-forming hardenable substance to produce a smooth non-thrombogenic surface on said fiber ends and manifold.

16. The method of claim 15, wherein said final potting is done centrifugally.

* * * * *

UNITED STATES PATENT AND TRADEMARK OFFICE
CERTIFICATE OF CORRECTION

PATENT NO. : 4,368,124
DATED : January 11, 1983
INVENTOR(S) : Robert C. Brumfield It is certified that error appears in the above—identified patent and that said Letters Patent is hereby corrected as shown below:

Column 6, line 58     "still" should be --stiff--.

Signed and Sealed this

Nineteenth Day of April 1983

[SEAL]

Attest:

GERALD J. MOSSINGHOFF

Attesting Officer     Commissioner of Patents and Trademarks